(12) United States Patent
Anderton et al.

(10) Patent No.: US 11,667,042 B2
(45) Date of Patent: Jun. 6, 2023

(54) RETAINER APPARATUS FOR MOVEMENT OF ARTICLES

(71) Applicant: Southwest Research Institute, San Antonio, TX (US)

(72) Inventors: Maximilian Dinsdale Anderton, Tampa, FL (US); Cody Michael Porter, Helotes, TX (US); Branson Patrick Brockschmidt, San Antonio, TX (US); Cody Eli Bressler, San Antonio, TX (US); Thomas E. Lyons, Jr., Rio Medina, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 134 days.

(21) Appl. No.: 17/305,847

(22) Filed: Jul. 15, 2021

(65) Prior Publication Data
US 2023/0017842 A1    Jan. 19, 2023

(51) Int. Cl.
*B25J 15/06* (2006.01)
*B25J 15/00* (2006.01)

(52) U.S. Cl.
CPC ......... *B25J 15/0666* (2013.01); *B25J 15/009* (2013.01); *B25J 15/0066* (2013.01)

(58) Field of Classification Search
CPC .................................................. B25J 15/0666
USPC ........ 414/373; 294/183, 184, 185, 188, 189, 294/213
See application file for complete search history.

(56) References Cited

U.S. PATENT DOCUMENTS

| | | | |
|---|---|---|---|
| 3,693,321 A | 9/1972 | Nilsson | |
| 8,485,576 B2 * | 7/2013 | Melville | B25J 15/0608 294/213 |
| 2012/0105088 A1 | 5/2012 | Murphy | |
| 2018/0029807 A1 * | 2/2018 | Oono | B25J 15/0633 |

FOREIGN PATENT DOCUMENTS

| | | | |
|---|---|---|---|
| EP | 0486719 | 5/1992 | |
| JP | 2000128477 A * | 5/2000 | |
| JP | 2003094368 A * | 4/2003 | |
| JP | 2013193191 A * | 9/2013 | |
| WO | WO-2020262022 A1 * | 12/2020 | B25J 15/0052 |

* cited by examiner

*Primary Examiner* — Gerald McClain
(74) *Attorney, Agent, or Firm* — Grossman, Tucker, Perreault & Pfleger, PLLC

(57) ABSTRACT

A retainer apparatus configured to releasably retain an article, comprising a face plate member each having a front face, a plurality of vacuum cups and a plurality of support pins each extending distally relative to the front face, respectively, wherein the vacuum cups and the support pins are laterally spaced from one another, wherein the plurality of vacuum cups retain the article to the retainer apparatus in a presence of vacuum, wherein the plurality of support pins are extendable/retractable relative to the face plate member, wherein each of the support pins have a longitudinal axis, respectively, and are configured to contact the article to support the article against movement along the longitudinal axis and support the article against movement transverse to the longitudinal axis, and a locking mechanism configured to inhibit the support pins from being retractable and extendable when the locking mechanism is engaged.

17 Claims, 8 Drawing Sheets

RETAINER APPARATUS FOR MOVEMENT OF ARTICLES

FIELD

The present disclosure relates to retainer apparatus to releasably retain articles movable from one location to another location. The articles may particularly be metal articles, such as sheet metal articles, and plastic articles, such as injection molded plastic articles.

BACKGROUND

A sheet metal article may be gripped by an apparatus from one side of the sheet metal article to allow for manufacturing and assembly processes to occur on the opposite side of the sheet metal article, as well as a perimeter/periphery of the sheet metal article. Examples of manufacturing processes may include welding, riveting, precision locating, grinding, and adhesive application. The retainer apparatus must have the flexibility to grip a variety of sheet metal articles within a set size range, while having a footprint no larger than the smallest article the apparatus can grip. Furthermore, the retainer apparatus must have the compliance to grip surfaces within a set range of variation heights, angles, and curvature. While gripped, the sheet metal article must be held to desired vertical and horizontal tolerances while resisting ancillary forces produced by manufacturing and assembling processes. Finally, the retainer apparatus must be designed to withstand a high cycles of manufacturing processes without repair, maintenance, or reconfiguration.

General-purpose industrial retainer apparatus, i.e. which may handle a wide range of sheet metal articles, are not capable of holding the sheet metal articles rigidly to a sub-millimeter resolution. This limitation prevents precision manufacturing and assembly because it allows the sheet metal article to shift when a force is applied to the sheet metal article. Conversely, custom retainer apparatus, i.e. particularly configured to only handle specific sheet metal articles, may offer increased resolution, but at increased capital investment in a production line. Such may be acceptable for high volume production, but it is limiting in low volume or high mix production. Therefore, a versatile, but rigid retainer apparatus, is desirable for a wide array of small batch industrial applications.

The present disclosure provides a retainer apparatus for picking and placing articles of varying geometries and materials.

SUMMARY

In certain embodiments, the present disclosure provides a retainer apparatus configured to releasably retain an article comprising a base plate member having a front face; a face plate member having a front face; wherein the face plate member and the base plate member are arranged adjacent one another with the face plate member and the base plate member substantially parallel to one another; a plurality of vacuum cups extending distally relative to the front face of the face plate member; a plurality of support pins extending distally relative to the front face of the face plate member; wherein the vacuum cups and the support pins are laterally spaced from one another about the front face of the face plate member; wherein the vacuum cups are configured to retain the article to the retainer apparatus in a presence of vacuum; wherein the plurality of support pins are movable as to be extendable and retractable relative to the face plate member, wherein each of the support pins have a longitudinal axis, respectively, and are configured to contact the article to support the article against movement along the longitudinal axis of the support pins and support the article against movement transverse to the longitudinal axis of the support pins; and a locking mechanism configured to inhibit the support pins from being retractable and extendable when the locking mechanism is engaged, and configured to permit the support pins to be retractable and extendable when the locking mechanism is disengaged.

In certain embodiments, the present disclosure provides a method of releasably holding an article, comprising obtaining a retainer apparatus configured to releasably retain the article, comprising a base plate member having a front face; a face plate member having a front face; wherein the face plate member and the base plate member are arranged adjacent one another with the face plate member and the base plate member substantially parallel to one another; a plurality of vacuum cups extending distally relative to the front face of the face plate member; a plurality of support pins extending distally relative to the front face of the face plate member; wherein the vacuum cups and the support pins are laterally spaced from one another about the front face of the face plate member; wherein the vacuum cups are configured to retain the article to the retainer apparatus in a presence of vacuum; wherein the plurality of support pins are movable as to be extendable and retractable relative to the face plate member, wherein each of the support pins have a longitudinal axis, respectively, and are configured to contact the article to support the article against movement along the longitudinal axis of the support pins and support the article against movement transverse to the longitudinal axis of the support pins; and a locking mechanism configured to inhibit the support pins from being retractable and extendable when the locking mechanism is engaged, and configured to permit the support pins to be retractable and extendable when the locking mechanism is disengaged; arranging the article with a horizontal orientation; arranging the retainer apparatus in a position which overlies the article; arranging the support pins in an extended position; moving at least one of the retainer apparatus and the article vertically towards one another such that at least some of the vacuum cups and at least some of the support pins make contact with the article, which results in at least some of the support pins retracting into the retainer apparatus; engaging the locking mechanism such that the support pins are inhibited from being extendable from or being retractable into the retainer apparatus; applying vacuum to the vacuum cups such that the article is held to the vacuum cups; manipulating the retainer apparatus such that the article is moved from one location to another location; terminating the vacuum to the vacuum cups; disengaging the locking mechanism such that the support pins are extendable from or retractable into the retainer apparatus; and releasing the article from the retainer apparatus.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
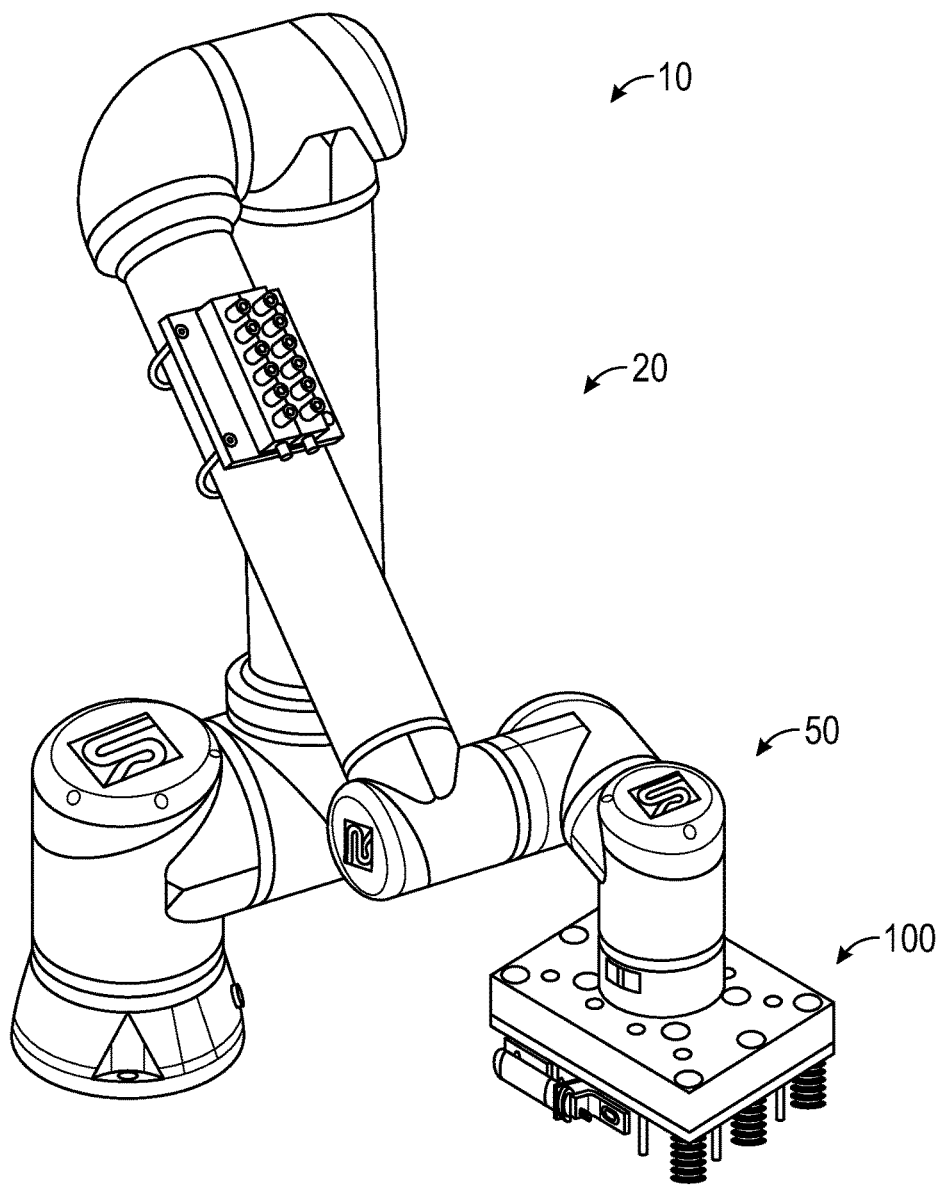
FIG. 1 is a perspective view of a multi-axis manipulator which incorporates a retainer apparatus according to the present disclosure.
Figure 1:
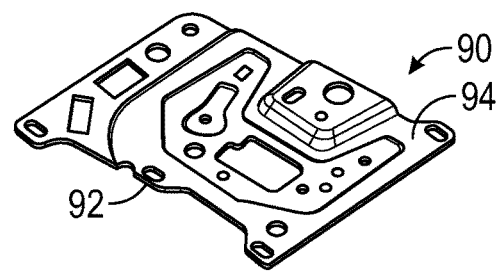

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring to FIG. 1, there is shown a multi-axis manipulator 10 according to the present disclosure. Multi-axis manipulator 10 may comprise a multi-axis robotic arm 20 having an end effector 50. As shown, the end effector 50 is positioned vertically above and overlying an article 90. The article 90 may particularly be a metal article, such as a sheet metal article, and/or a plastic article, such as injection molded plastic article. The article 90 may have a surface area dimension of in a range of 3 inches by 3 inches to 3 feet by 3 feet. More particularly, the article 90 may have a surface area dimension of in a range of 9 inches by 9 inches to 2.5 feet by 2.5 feet.

As shown, end effector 50 comprises a retainer apparatus 100 disposed at a distal end of the end effector 50, as well as the multi-axis robotic arm 20. As shown, the retainer apparatus 100 may be particularly configured to releasably retain/hold the article 90 by retaining/holding the article 90 only on one side, such as rear face 94, without having the grasp the article 90 on two opposite sides, such as front face 92 and rear face 94, such as by clamping from the opposite sides.

Figure 2:
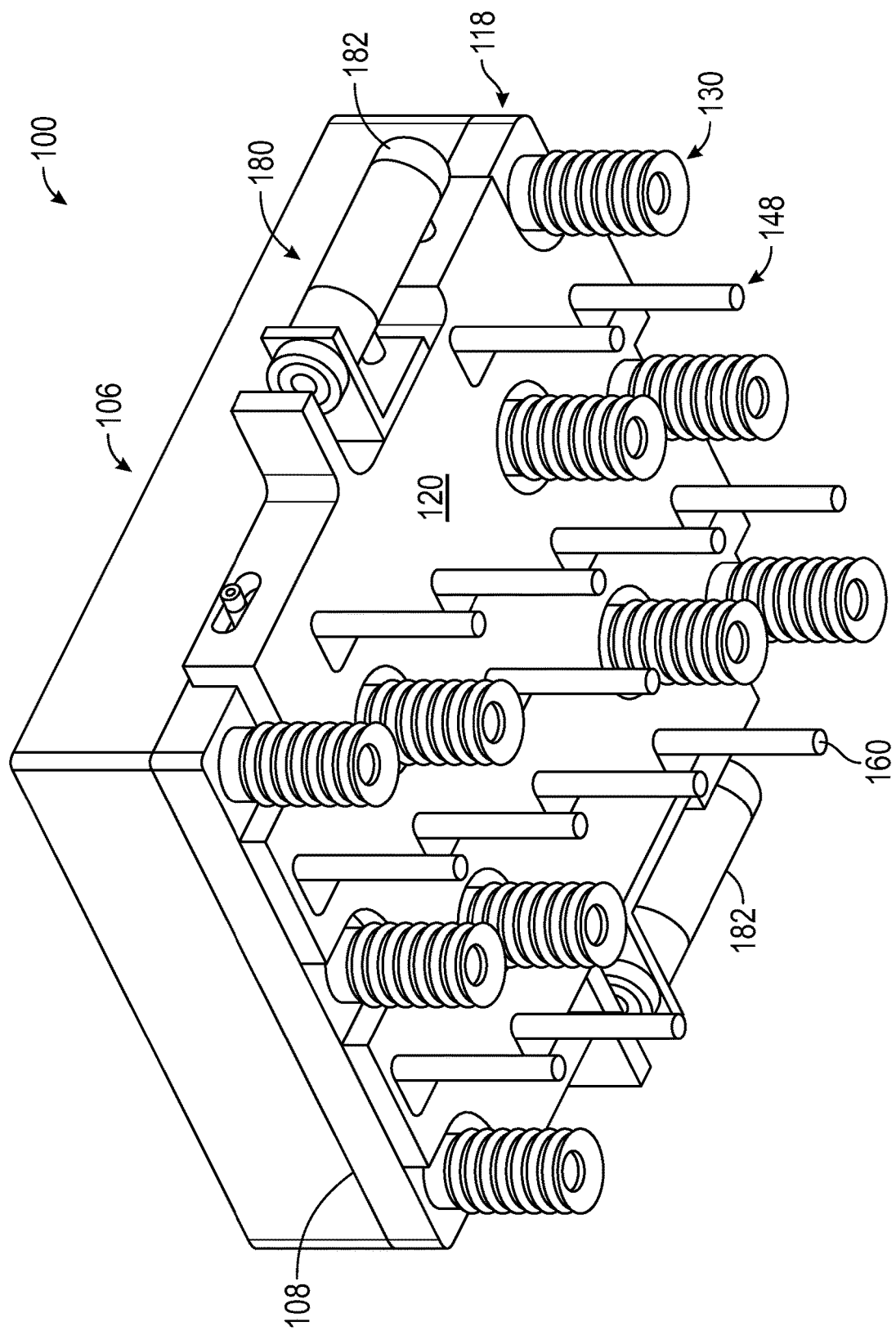
FIG. 2 is a perspective view of the retainer apparatus shown in FIG. 1.
Figure 3:
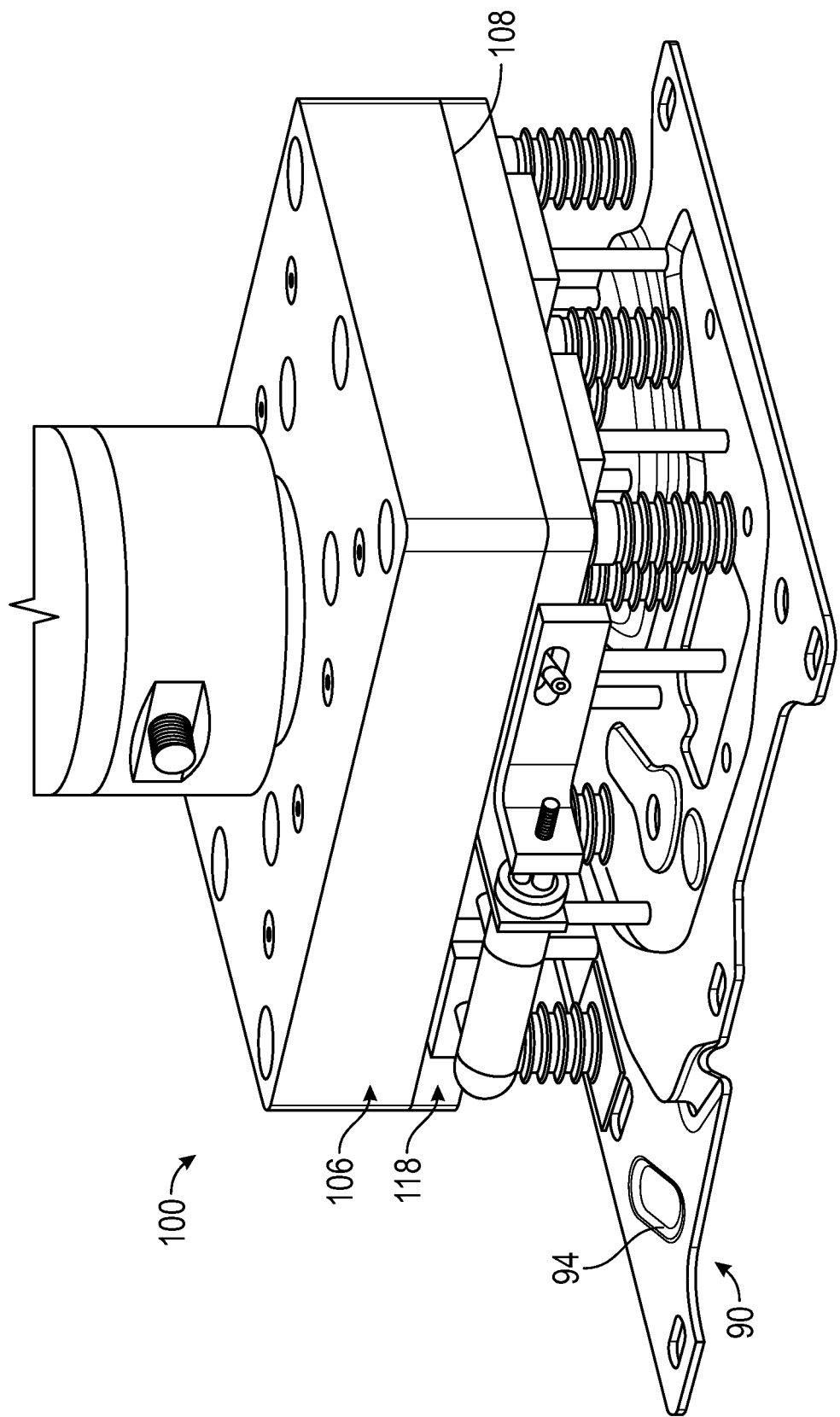
FIG. 3 is a perspective view of the retainer apparatus shown in FIG. 1 with an article.
Figure 4:
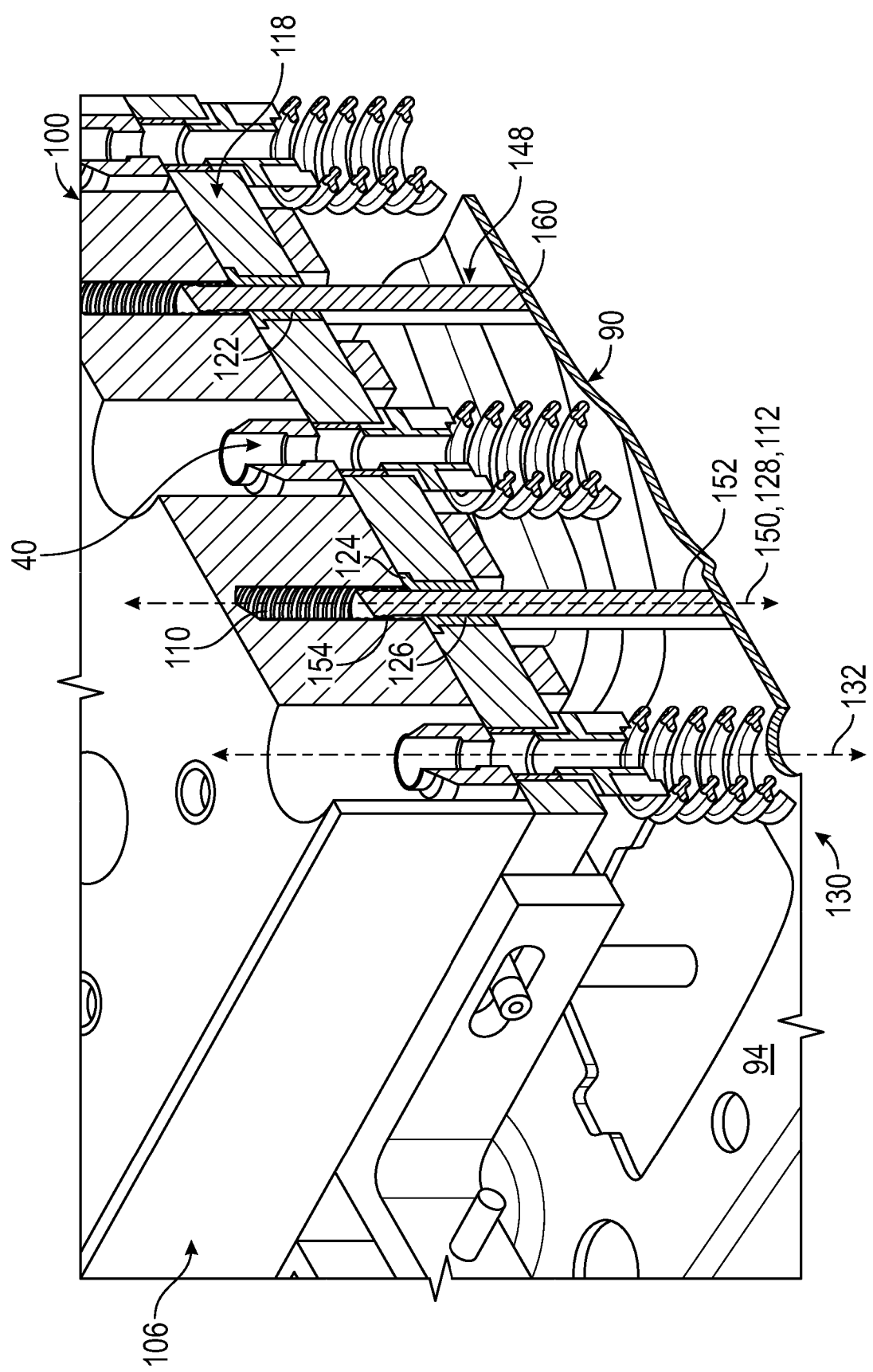
FIG. 4 is a cross sectional view of the retainer apparatus and the article shown in FIG. 3.

As shown by FIGS. 2-4, retainer apparatus 100 comprises a rear (proximal) base plate member 106 and a forward (distal) face plate member 118. As shown, the face plate member 118 and the base plate member 106 are arranged adjacent one another with the face plate member 118 underlying a front face 108 of the base plate member 106, and arranged with the face plate member 118 and the base plate member 106 substantially parallel (e.g. parallel within manufacturing tolerances) to one another.

Retainer apparatus 100 further comprises a plurality of compliant (resiliently deformable) vacuum (suction) cups 130, and a plurality of moveable (e.g. extendable/retractable) support pins 148. As shown, the vacuum cups 130 and the support pins 148 all extend distally relative to each of the base plate member 106 and the face plate member 118, particularly from the front face 120 of the face plate member 118. More particularly, a longitudinal (center) axis 132 of the vacuum cups 130 and a longitudinal (center) axis 150 of the support pins 148 are substantially parallel (e.g. parallel within manufacturing tolerances) to one another, and substantially perpendicular (e.g. perpendicular within manufacturing tolerances) to the front face 120 of the face plate member 118. The support pins 148 are movable axially (extendable and retractable) along the longitudinal axis 150 of the pins 148 substantially perpendicular (e.g. perpendicular within manufacturing tolerances) to the front face 120 of the face plate member 118. As shown, each of the vacuum cups 130 and the support pins 148 are laterally spaced from one another about the front face 120 of the face plate member 118 whereby their respective longitudinal axes 132, 150 are not coaxial.

The plurality of vacuum cups 130 are configured to retain the article 90 to the retainer apparatus 100 in a presence of vacuum (negative pressure) from vacuum source 40, and the plurality of support pins 148 are configured to contact rear face 94 of the article 90, and support the article 90 against movement, such as deformation, along the longitudinal axis 150 of the support pins 148 (vertical deformation) and support the article 90 against movement transverse (perpendicular) to the longitudinal axis 150 of the support pins 148 (horizontal shifting).

For example, with the retainer apparatus 100 of FIG. 2, a position tolerance of 0.1 mm or less, in both the vertical and horizontal directions, is attainable under a maximum load of 25 pounds for the article 90.

As best shown by FIG. 4, the vacuum cups 130 are mounted to the face plate member 118. The vacuum cups 130 have compliance and deformability allowing them to conform to the surfaces of varied heights and curvatures of the article 90, such as those found on non-planer articles 90. The vacuum cups 130 may have a diameter in a range of 0.5 inch to 1.5 inch, and more particularly in a range of 0.75 inch to 1.25 inch.

The vacuum cups 130 seal with the article 90 when vacuum from vacuum source 40 is activated, and then return to their pre-activated shape after the vacuum is terminated and the article 90 is released from the retainer apparatus 100. If due to the contour of the article 90, one or more of the vacuum cups 130 does not make sufficient contact with the article 90 to form a vacuum seal therewith, the vacuum cups 130 may self-seal (e.g. via a closable valve) to prevent a loss of vacuum. For example, if the article 90 being held by the retainer apparatus 100 is of a size such than the article 90 does not underlie certain vacuum cups 130 and hence may not form a vacuum seal with the article 90, the vacuum cups 130 may have a closeable valve which closes automatically in response to vacuum loss, which will ensure that the suction cups 130 that are in contact with the article 90 have as much vacuum as possible to hold the article 90.

A shaft 152 of the support pins 148 extends through a through-hole 126 of a bushing 124, which is mounted in a through-hole 122 in the face plate member 118, and into a blind-hole 110 in the base plate member 106. A head 154 of the support pins 148, as well as the shaft 152, may extend and retract into the blind-hole 110, however the head 154 of the support pins 148 mechanically engages with the bushing 124 to inhibit the support pin 148 from being withdrawn from the retainer apparatus 100. The shaft 152 of the support pins 148 may have a diameter in a range of 0.125 inch to 0.5 inch, and more particularly in a range of 0.25 inch to 0.375 inch. The head 154 of the support pins 148 may have a maximum outer diameter which is 0.001 inch to 0.01 inch smaller than a maximum inner diameter of the blind hole 110. The bushing 124 may be formed of metal (e.g. bronze) and/or a polymer material, such as a rigid plastic (e.g. nylon, acetal) or an elastomer (e.g. rubber).

Figure 5:
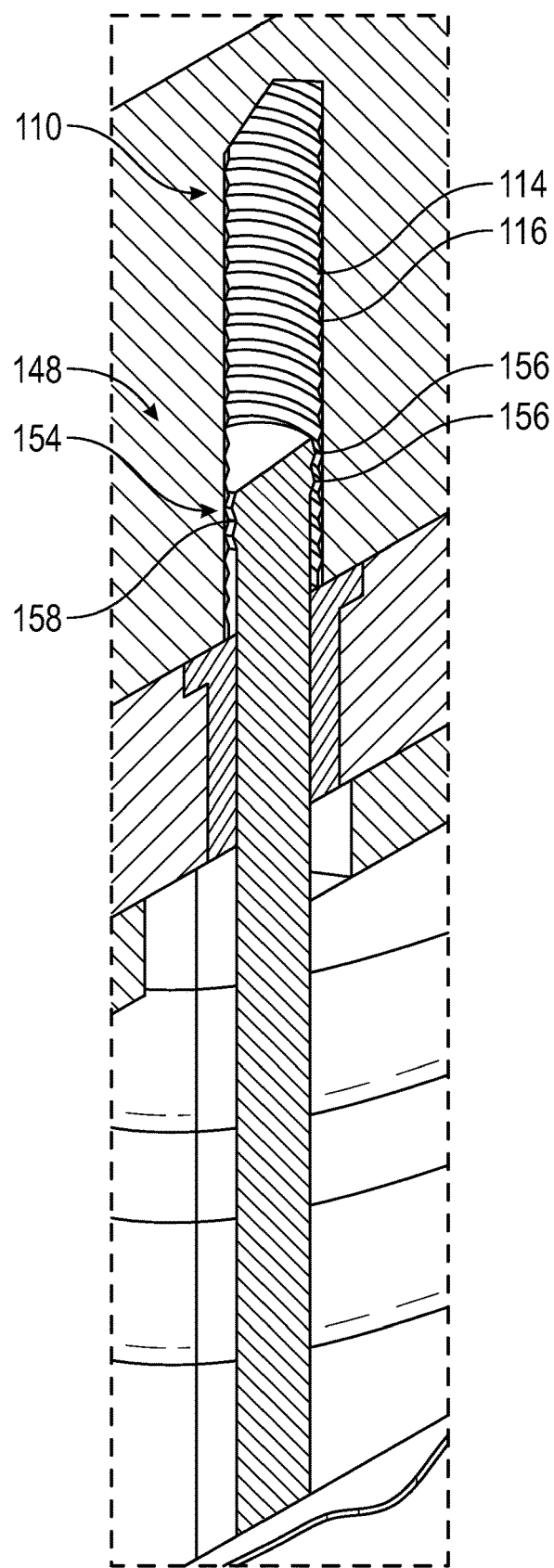
FIG. 5 is a close-up sectional view of the retainer apparatus of FIG. 4.

As best shown by FIG. 5, the longitudinal face of the head 154 of the support pins 148 (i.e. the cylindrical face) may include one or more annular ridges 156 and one or more annular grooves 158. Where there is a plurality of the ridges 156 (which may also be referred to as teeth) and grooves 158 (which may also be referred to as undercuts), such may alternate along a longitudinal length of the head 154 of the support pins 148. Conversely, as shown, the longitudinal face of the shaft 152 is smooth, i.e. no ridges or grooves and has a uniform diameter.

Similarly, the longitudinal face of the blind-hole 110 of the base plate member 106 may also include one or more annular ridges 114 and one or more annular grooves 116. Where there is a plurality of the ridges 114 (which may also be referred to as teeth) and grooves 116 (which may also be referred to as undercuts), such may alternate along a longitudinal length of the blind-hole 110.

As explained in greater detail below, the annular ridge(s) 156 and/or annular groove(s) 158 of the head 154 of the support pins 148 may be configured to engage/mate (mesh) with the annular groove(s) 116 and/or ridges ridge(s) 114 of the blind-holes 110 over a portion of their annular circumference to provide a lock, with positive mechanical engagement, which positively mechanically locks a longitudinal position of the support pins 148 relative to the base plate member 106.

The support pins 148 may travel downward (distally) via gravity, and upwards (proximally) via contact with the article 90 pushing them in such direction. Alternatively, the support pins 148 may also travel with the assistance of springs, pneumatics (e.g. compressed air) or hydraulics. The actuation of the support pins 148 individually permits the support pins 148 to contact a non-planer article 90 at varying levels of extension/retraction.

As set forth above, the longitudinal (center) axis 132 of each vacuum cup 130 and the longitudinal (center) axis 150 of each support pin 148 are preferably substantially parallel (e.g. parallel within manufacturing tolerances) to one another. The longitudinal (center) axis of each vacuum cup 130 and each support pin 148 may be understood to transgress an imaginary plane which is perpendicular to the longitudinal (center) axis 132, 150 of each vacuum cup 130 and each support pin 148, respectively.

Figure 6:
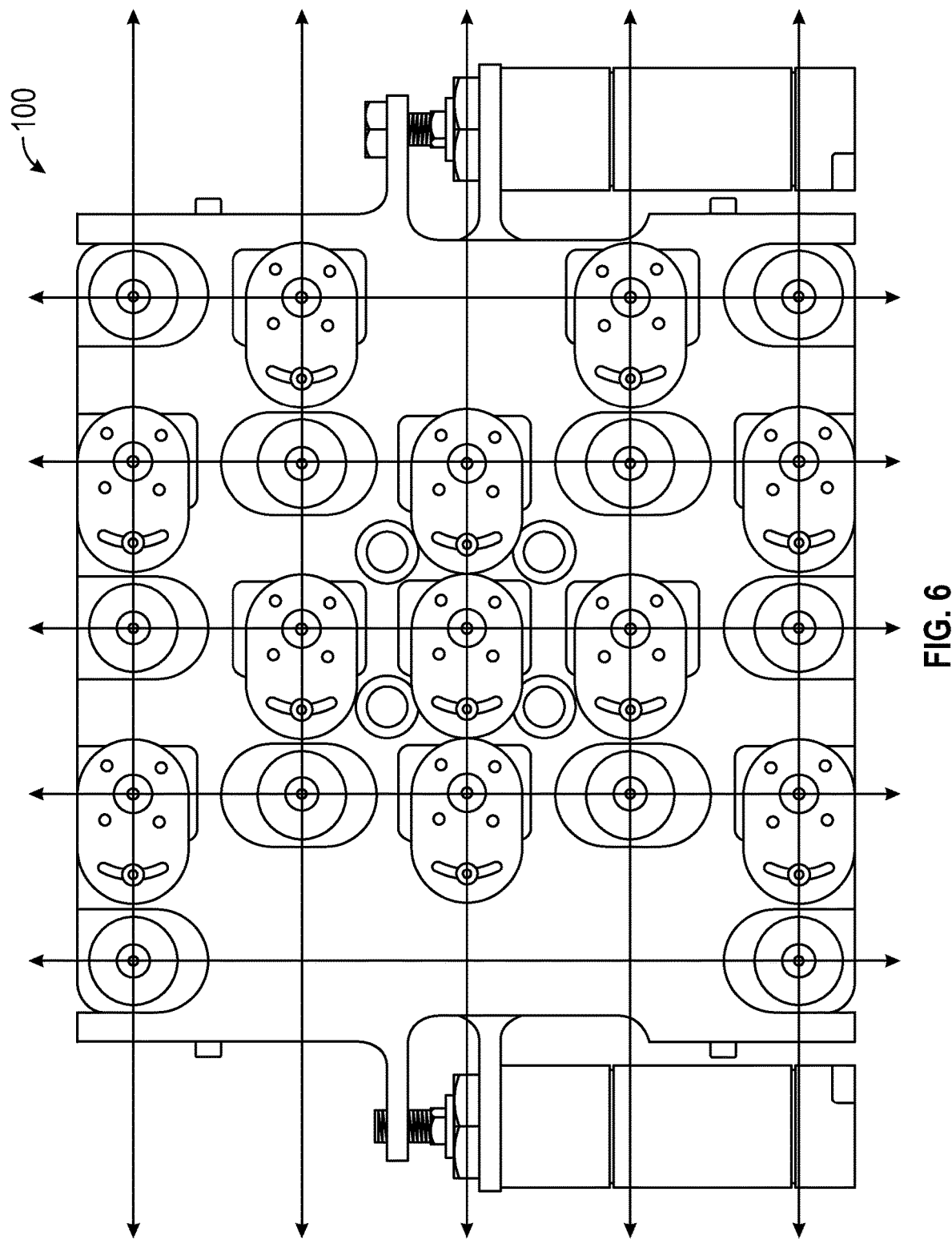
FIG. 6 is plan view of the face plate member of the retainer apparatus.

As shown, perhaps best by FIG. 6, preferably the vacuum cups 130 and the support pins 148 are arranged substantially on-center (e.g. on-center within manufacturing tolerances) in a grid/matrix pattern of a plurality of linear rows and linear columns which are substantially perpendicular (e.g. perpendicular within manufacturing tolerances) to each other. Preferably, the vacuum cups 130 and the support pins 148 are arranged such the rows and columns formed by the vacuum cups 130 and the support pins 148 are equally spaced from one another. In certain embodiments, the on-center lateral spacing of the vacuum cups 130 and the support pins 148 may be in a range of 0.75 inches to 2 inches, and more particularly in a range of 1 inch to 1.5 inches. Preferably, the longitudinal (center) axis 150 of at least one of the support pins 148 is disposed equidistant from the longitudinal (center) axis 132 of at least two adjacent vacuum cups 130. More particularly, the longitudinal (center) axis 150 of more than one of the support pins 148 is preferably disposed equidistant from the longitudinal (center) axis 132 of at least two adjacent vacuum cups 130.

More preferably, the longitudinal (center) axis 150 of at least one of the support pins 148 is disposed equidistant from the longitudinal (center) axis 132 of at least three adjacent vacuum cups 130. More particularly, the longitudinal (center) axis 150 of more than one of the support pins 148 is preferably disposed equidistant from the longitudinal (center) axis 132 of at least three adjacent vacuum cups 130.

Even more preferably, the longitudinal (center) axis 150 of at least one of the support pins 148 is disposed equidistant from the longitudinal (center) axis 132 of three adjacent vacuum cups 130. More particularly, the longitudinal (center) axis 150 of at least one of the support pins 148 is disposed equidistant from the longitudinal (center) axis 132 of four adjacent vacuum cups 130.

With regards to the releasable holding of the article 90, the end effector 50, and more particularly the retainer apparatus 100, may approach the article 90 with the support pins 148 in an extended position and the article 90 arranged with a horizontal orientation.

After the retainer apparatus 100 is arranged into a position overlying the article 90, the retainer apparatus 100 is lowered vertically relative to the article 90 and/or the article 90 is raised vertically relative to the retainer apparatus 100 such that a distal end face 160 of at least some of the support pins 148 makes contact with the facing surface 94 of the article 90, which results in at least some of the support pins 148 retracting into the blind hole 110 of the base plate member 106 of the retainer apparatus 100.

The length of retraction of each support pin 148 into the respective blind hole 110 may vary depending on the contour of the article 90. Preferably, all of the support pins 148 make contact with the article 90. The array of varying height support pins 148 contoured to the contour of the article 90 creates a rigid back support for the article 90. The retainer apparatus 100 as shown may accommodate a vertical height change of the article 90 up to 2 inches.

Once the support pins 148 are positioned longitudinally, a locking mechanism 180 is engaged which is configured to lock (hold stationary) all the support pins 148 in a fixed position so that the support pins 148 are inhibited from any further extending or retracting. Stated another way, the locking mechanism 180 is configured to inhibit the support pins 148 from being retractable and extendable when the locking mechanism 180 is engaged, and configured to permit the support pins 148 to be retractable and extendable when the locking mechanism 180 is disengaged.

As shown, the locking mechanism 180 comprises two linear actuators 182 (e.g. shown as hydraulic or pneumatic cylinders) which each comprise an actuator body 184 mounted to the base plate member 106 and a movable (extendable/retractable) actuator rod 186 mounted to the face plate member 118.

As shown, the linear actuators 182 are mounted such that the face plate member 118 is movable laterally substantially perpendicular (e.g. perpendicular within manufacturing tolerances) to the front face 108 of the base plate member 106.

In an unlocked position of the support pins 148, when the linear actuators 182 and plate members 106, 118 are in their aligned position, the longitudinal (center) axis 150 of each support pin 148 is aligned coaxial with the longitudinal (center) axis 112 of each respective blind hole 110 and the longitudinal (center) axis 128 of each respective bushing 124 through which it extends, such that each support pin 148 moves (extends or retracts) freely relative to its respective blind hole 110 and bushing 124.

Furthermore, it should be understood, when the longitudinal (center) axis 150 of each support pin 148 is coaxial with the longitudinal (center) axis 112 of each respective blind hole 110 and the longitudinal (center) axis 128 of each respective bushing 124 through which it extends, the annular ridge(s) 156 and/or annular groove(s) 158 of the head 154 of the support pins 148, if present, are disengaged from the annular groove(s) 116 and/or ridges ridge(s) 114 of the blind-holes 110 such that the support pins 148 may move axially within the blind-holes 110.

However, when the actuator rods 186 are extended, the face plate member 118 is moved laterally substantially perpendicular (e.g. perpendicular within manufacturing tolerances) to the front face 108 of the base plate member 106.

Due to the lateral movement of the face plate member 118, the longitudinal (center) axis 112 of each blind-hole 110 of the base plate member 108 and the longitudinal (center) axis 128 of the bushing through-hole 126 of the bushing 124 of the face plate member 118 are no longer coaxial.

Figure 7A:
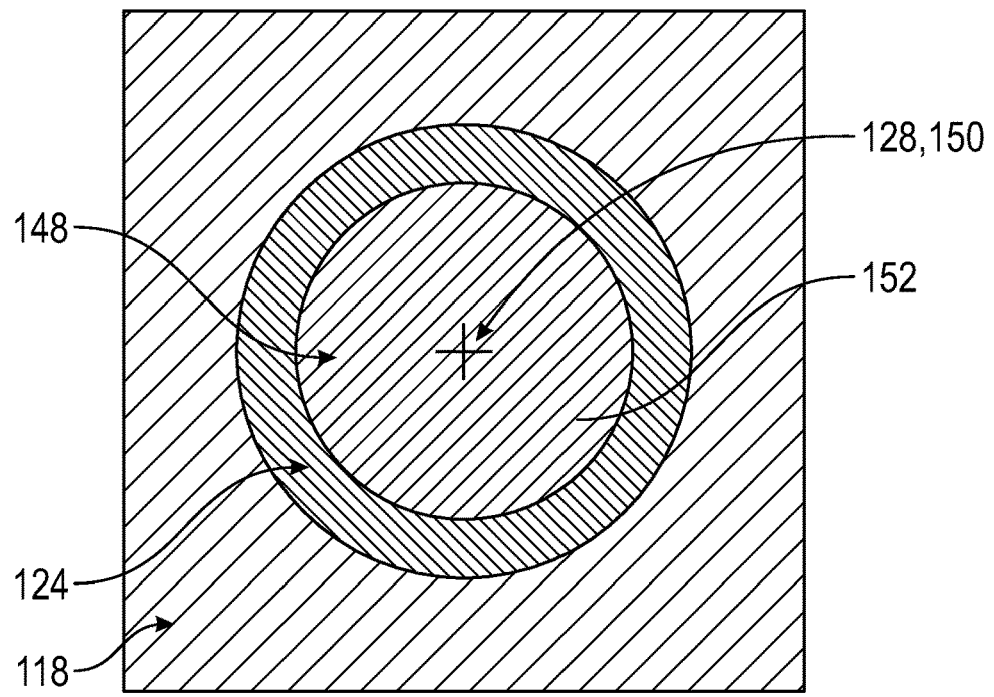
FIGS. 7A and 7B are cross-sectional views taken through a bushing surrounding a support pin of the retainer apparatus when a locking mechanism for the support pin is disengaged and engaged, respectively.
Figure 7B:
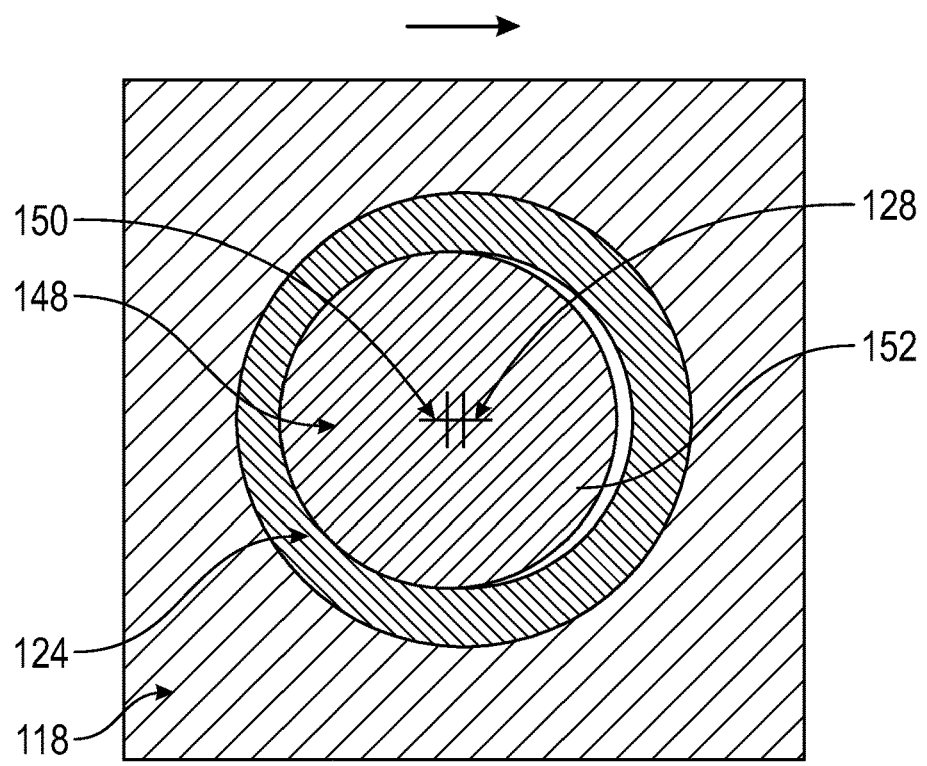

Referring now to FIGS. 7A-7B, such show how a change in position of the face place member 118 when the actuator rods 186 are retracted and extended, respectively, may deform bushing 124. The deformation shown may be somewhat larger than expected, for the purpose of making such more apparent in the illustration.

In first considering a design of the retainer apparatus 100 where the support pins 148 are configured with minimal lateral movement in the blind-holes 110 (such as where the support pins 148 and blind-holes 110 do not include annular ridges 156, 114 and grooves 158, 116, respectively), it may be understood that, due to the lateral movement of the face plate member 118, each of the bushings 124, which moved laterally with the face plate member 118 as shown in FIG. 6B, are now being laterally pressed against the support pin 148 which extends through it, particularly as the support pins 148 will have very limited lateral movement.

As a result of this lateral force/pressure, it may also be understood that the friction between each support pin 148 and respective bushing 124 is increased such that each support pin 148 no longer moves (extends or retracts) freely relative to its respective bushing 124, but rather are held locked in place by the frictional force created between each support pin 148 and the respective bushing 124.

Alternatively, when the head 154 of the support pins 148 and the blind-holes 110 of the base plate member 106 include engageable/disengageable annular ridges 156, 114 and grooves 158, 116, respectively, the support pins 148 may initially laterally move with the face plate member 118 such that the annular ridge(s) 156 and/or annular groove(s) 158 of the head 154 of the support pins 148 engage/mate (mesh) with the annular groove(s) 116 and/or ridges ridge(s) 114 of the blind-holes 110 over a portion of their annular circumference to provide a lock, with positive mechanical engagement, which positively mechanically locks a longitudinal position of the support pins 148 relative to the base plate member 106.

However, after the engagement of the annular ridge(s) 156 and/or annular groove(s) 158 of the head 154 of the support pins 148 with the annular groove(s) 116 and/or ridges ridge(s) 114 of the blind-holes 110 bottoms out and the support pins 148 may not move laterally any further, continued lateral movement of the face plate member 118 may result in the bushings 124 being laterally pressed against the support pin 148 which extends through it as explained above. As a result of this lateral force/pressure, it may also be understood that the support pins 148 are held locked in place by both positive mechanical engagement with the blind-holes 110, as well as frictional engagement with the respective bushing 124.

Figure 8:
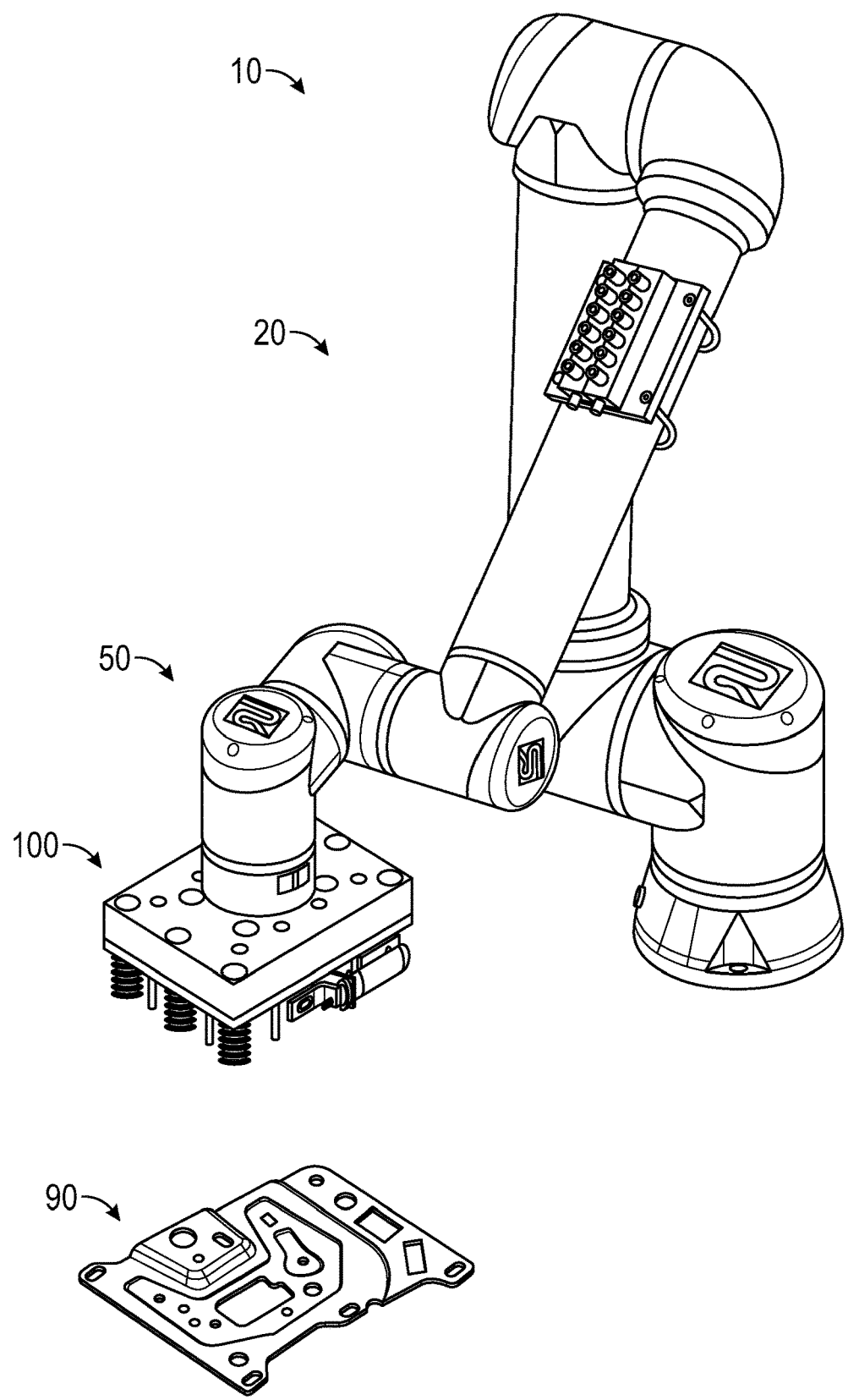
FIG. 8 is a perspective view of the multi-axis manipulator with the retainer apparatus of FIG. 1 after a sheet metal part has been moved and released.

The vacuum cups 130 are preferably arranged to make contact with the article 90 and seal against the article 90 at or about a same time as the support pins 148. Once the support pins 148 are locked, vacuum is applied to the vacuum cups 130 to draw and releasably retain/hold the article 90 tightly against the adjacent support pins 148. The normal force created by the vacuum cups 130 between the article 90 and the support pins 148 secures the article 90 from moving in all directions by both direct interference and friction. The retainer apparatus 100 and the article 90 may then be manipulated by the multi-axis manipulator 10 such that the article 90 is moved from one location to another location. Thereafter, as shown in FIG. 8, the article 90 may be subsequently released by terminating the vacuum, at or about a same time of which the actuator rods 186 of the locking mechanism 180 are retracted to their home/initial position to move the face plate member 118 laterally in a second opposite direction which is reverse of the first direction, upon which the support pins 148 are freely movable once again and may extend to their extended position, particularly due to gravity.

Finally, with individual displacement sensors, the contact positions of the support pins 148 may be used as a part identification and coarse positioning feedback.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LIST OF REFERENCE CHARACTERS 10 multi-axis manipulator
20 multi-axis robotic arm
50 end effector
90 article
92 front face of article
100 rear face of article
100 retainer apparatus
106 rear (proximal) base plate member
108 front face of base plate member
110 blind-hole
112 longitudinal (center) axis of blind-hole
114 annular ridges/teeth
116 annular grooves/undercuts
118 forward (distal) face plate member
120 front face of face plate member
122 through-hole of face plate member
124 bushing
126 through-hole of bushing
128 longitudinal (center) axis of bushing through-hole
130 vacuum cups
132 longitudinal (center) axis of vacuum cups
148 support pins
150 longitudinal (center) axis of support pins
152 shaft
154 head
156 annular ridges/teeth
158 annular grooves/undercuts 160 end face
180 support pin locking mechanism
182 linear actuator
184 actuator body
186 actuator rod

What is claimed is:

1. A method of releasably holding an article, comprising:
obtaining a retainer apparatus configured to releasably retain the article, comprising
a base plate member having a front face;
a face plate member having a front face;
wherein the face plate member and the base plate member are arranged adjacent one another with the face plate member and the base plate member substantially parallel to one another;
a plurality of vacuum cups extending distally relative to the front face of the face plate member;
a plurality of support pins extending distally relative to the front face of the face plate member;
wherein the vacuum cups and the support pins are laterally spaced from one another about the front face of the face plate member;
wherein the vacuum cups are configured to retain the article to the retainer apparatus in a presence of vacuum;
wherein the plurality of support pins are movable as to be extendable and retractable relative to the face plate member, wherein each of the support pins have a longitudinal axis, respectively, and are configured to contact the article to support the article against movement along the longitudinal axis of the support pins and support the article against movement transverse to the longitudinal axis of the support pins; and
a locking mechanism configured to inhibit the support pins from being retractable and extendable when the locking mechanism is engaged, and configured to permit the support pins to be retractable and extendable when the locking mechanism is disengaged;
arranging the article with a horizontal orientation;
arranging the retainer apparatus in a position which overlies the article;
arranging the support pins in an extended position;
moving at least one of the retainer apparatus and the article vertically towards one another such that at least some of the vacuum cups and at least some of the support pins make contact with the article, which results in at least some of the support pins retracting into the retainer apparatus;
engaging the locking mechanism such that the support pins are inhibited from being extendable from or being retractable into the retainer apparatus;
applying vacuum to the vacuum cups such that the article is held to the vacuum cups;
manipulating the retainer apparatus such that the article is moved from one location to another location;
terminating the vacuum to the vacuum cups;
disengaging the locking mechanism such that the support pins are extendable from or retractable into the retainer apparatus; and
releasing the article from the retainer apparatus;
wherein the locking mechanism comprises the face plate member and is engaged by moving the face plate member in a first direction substantially perpendicular to the front face of the base plate member to apply a force substantially perpendicular to the longitudinal axis of the support pins; and
engaging the locking mechanism such that the support pins are inhibited from being extendable from or being retractable into the retainer apparatus comprises moving the face plate member in the first direction such that the force is applied substantially perpendicular to the longitudinal axis of the support pins.

2. The method of claim 1, wherein the locking mechanism is disengaged by moving the face plate member in a second direction substantially perpendicular to the front face of the base plate member which is opposite the first direction to remove the force from the support pins; and
disengaging the locking mechanism such that the support pins are extendable from or retractable into the retainer apparatus comprises moving the face plate member in the second direction such that the force is removed from the support pins.

3. The method of claim 1, wherein each of the support pins extends through a through-hole of a respective bushing which is mounted in the face plate member; and
moving the face plate member in the first direction such that the force is applied substantially perpendicular to the longitudinal axis of the support pins comprises moving the face plate member in the first direction such that the force is applied substantially perpendicular to the longitudinal axis of the support pins with the respective bushing mounted in face plate member.

4. The method of claim 3, wherein when the force is applied substantially perpendicular to the longitudinal axis of the support pins with the respective bushing mounted in face plate member such compresses the respective bushing.

5. The method of claim 3, wherein the respective bushing is formed of metal and/or a polymer.

6. The method of claim 1, wherein each of the support pins is disposed in a respective hole of the base plate member, wherein each of the support pins includes at least one ridge and/or at least one groove configured to mechanically engage with at least one groove and/or at least one ridge of the respective hole of the base plate member, respectively;
wherein the locking mechanism comprises the face plate member and is engaged by moving the face plate member in a first direction substantially perpendicular to the front face of the base plate member to engage the at least one ridge and/or the at least one groove of the support pins with the at least one groove and/or at least one ridge of the respective hole of the base plate member, respectively; and
engaging the locking mechanism such that the support pins are inhibited from being extendable from or retractable into the retainer apparatus comprises moving the face plate member in the first direction such that the at least one ridge and/or the at least one groove of the support pins engage with the at least one groove and/or the at least one ridge of the respective hole of the base plate member, respectively.

7. The method of claim 6, wherein the locking mechanism is disengaged by moving the face plate member in a second direction substantially perpendicular to the front face of the base plate member which is opposite the first direction to disengage the at least one ridge and/or the at least one groove of the support pins from the at least one groove and/or at least one ridge of the respective hole of the base plate member, respectively; and
disengaging the locking mechanism such that the support pins are extendable from or retractable into the retainer apparatus comprises moving the face plate member in the second direction such that the at least one ridge and/or the at least one groove of the support pins disengage from the at least one groove and/or the at least one ridge of the respective hole of the base plate member, respectively.

8. The method of claim 1, wherein the retainer apparatus is an end effector for a robotic arm.

9. The method of claim 1, further comprising a robotic arm; and
wherein the retainer apparatus is disposed as an end effector of the robot arm.

10. A retainer apparatus configured to releasably retain an article, comprising:
a base plate member having a front face;
a face plate member having a front face;
wherein the face plate member and the base plate member are arranged adjacent one another with the face plate member and the base plate member substantially parallel to one another;
a plurality of vacuum cups extending distally relative to the front face of the face plate member;
a plurality of support pins extending distally relative to the front face of the face plate member;
wherein the vacuum cups and the support pins are laterally spaced from one another about the front face of the face plate member;
wherein the vacuum cups are configured to retain the article to the retainer apparatus in a presence of vacuum;
wherein the plurality of support pins are movable as to be extendable and retractable relative to the face plate member, wherein each of the support pins have a longitudinal axis, respectively, and are configured to contact the article to support the article against movement along the longitudinal axis of the support pins and support the article against movement transverse to the longitudinal axis of the support pins; and
a locking mechanism configured to inhibit the support pins from being retractable and extendable when the locking mechanism is engaged, and configured to permit the support pins to be retractable and extendable when the locking mechanism is disengaged;
wherein the locking mechanism comprises the face plate member and is engaged by moving the face plate member in a first direction substantially perpendicular to the front face of the base plate member to apply a force substantially perpendicular to the longitudinal axis of the support pins.

11. The retainer apparatus of claim 10, wherein the locking mechanism is disengaged by moving the face plate member in a second direction substantially perpendicular to the front face of the base plate member which is opposite the first direction to remove the force from the support pins.

12. The retainer apparatus of claim 10, wherein each of the support pins extends through a through-hole of a respective bushing which is mounted in the face plate member.

13. The retainer apparatus of claim 12, wherein the respective bushing is formed of metal and/or a polymer.

14. The retainer apparatus of claim 10, wherein each of the support pins is disposed in a respective hole of the base plate member, wherein each of the support pins includes at least one ridge and/or at least one groove configured to mechanically engage with at least one groove and/or at least one ridge of the respective hole of the base plate member, respectively; and
wherein the locking mechanism comprises the face plate member and is engaged by moving the face plate member in a first direction substantially perpendicular to the front face of the base plate member to engage the at least one ridge and/or the at least one groove of the support pins with the at least one groove and/or at least one ridge of the respective hole of the base plate member, respectively.

15. The retainer apparatus of claim 14, wherein the locking mechanism is disengaged by moving the face plate member in a second direction substantially perpendicular to the front face of the base plate member which is opposite the first direction to disengage the at least one ridge and/or the at least one groove of the support pins from the at least one groove and/or at least one ridge of the respective hole of the base plate member, respectively.

16. The retainer apparatus of claim 10, wherein the retainer apparatus is an end effector for a robotic arm.

17. The retainer apparatus of claim 10, wherein the retainer apparatus is disposed as an end effector of a robot arm.

* * * * *